June 28, 1966   J. P. HEPPNER ETAL   3,258,687
WIDE RANGE LINEAR FLUXGATE MAGNETOMETER
Filed July 30, 1963

INVENTORS
HAROLD R. BOROSON
JAMES P. HEPPNER
BY
ATTORNEYS

United States Patent Office 3,258,687
Patented June 28, 1966

3,258,687
WIDE RANGE LINEAR FLUXGATE MAGNETOMETER
James P. Heppner and Harold R. Boroson, Silver Spring, Md., assignors to the United States of America as represented by the Administrator of the National Aeronautics and Space Administration
Filed July 30, 1963, Ser. No. 298,799
6 Claims. (Cl. 324—43)

The invention described herein may be manufactured and used by and for the Government of the United States of America for governmental purposes without the payment of any royalties thereon or therefor.

This invention relates generally to magnetometers, and more particularly to a wide dynamic range, linear fluxgate magnetometer for measurement of magnetic field intensities from a few gammas to several gauss (1 gamma = $10^{-5}$ gauss)

Magnetometers have, in recent years, become valuable to space exploration for measuring the earth's magnetic field and for determining the orientation of spacecraft relative to the earth's magnetic field. Magnetometers incorporating a saturable core fluxgate sensor have been extensively used in these measurements. Advantageous characteristics of the saturable core fluxgate magnetometer reside in its simplicity of construction and in its use of non-specialized electronic components. It provides a rugged magnetic field measuring device capable of being used on aircraft for strong field measurements near the earth's surface or on space vehicles for weak field measurements at higher altitudes. However, magnetometers of the saturable core fluxgate type, are not limited to measuring the earth's magnetic field, but are useful in other environments. For example these devices can be used for measuring, magnetic fields created in laboratories for experimental purposes or those created by commercial equipment and used for industrial applications. The magnetometer is also useful in the detection of natural magnetic bodies and man-made objects possessing magnetic fields such as submarines.

A fluxgate magnetometer measures the component of a magnetic field that exists along the principal axis of its fluxgate sensor. Measurements can be made with single sensors, with three orthogonal sensors to give total field information, or with any arrangement suitable to the field being measured.

Previously developed magnetometers of the saturable core fluxgate type possess structural characteristics somewhat similar to the instant invention. These magnetometers include as a basic element the ordinary fluxgate sensor. The saturable core of said fluxgate sensor is driven around its B-H hysteresis curve by an audio-frequency signal, typically between 1 and 20 k.c./s., that carries the core well into saturation at each end of the driving cycle. As long as there is no magnetic field component parallel to the core's axis, the output signal from the detecting winding surrounding the core is symmetrical and does not contain any even harmonics of the fundamental driving frequency. When a magnetic field component appears along the core's axis it effectively biases the core such that it is driven further into saturation in one direction than the other, and the asymmetrical output waveform contains even harmonics. This signal is rectified in a phase detector circuit, resulting in a D.C. output that is generally proportional to the magnitude of the magnetic field component existing along the principal axis of the fluxgate sensor.

The operating range of such a fluxgate magnetometer can be electronically limited to a narrow range of magnetic field strength. By limiting the operating range to a rather narrow range an accurate analog indication of the intensity of the magnetic field parallel to the sensor's principal axis may be obtained. If the range is not limited, a nonlinear, inaccurate indication has been found to result. Consequently, one of the major problems of a magnetometer incorporating a saturable core fluxgate is this narrow range of magnetic field that can be measured with reasonable accuracy. Therefore, without the use of involved feed-back techniques or point-to-point calibrations, the fluxgate is normally limited to weak field measurements, within its narrow linear range, when accuracies within a few gammas are desired.

A further disadvantage existent in prior art devices is that the output voltage, being in a limited range analog form, is difficult to convert accurately to digital form for easy electrical transmission to a point remote from the place of measurement.

Furthermore, even with the use of the involved techniques mentioned in the preceding paragraph it becomes difficult to achieve a high degree of accuracy (e.g., errors less than 0.1 percent) in a strong field as a consequence of the inherent errors in an instrument which has an analog output.

Accordingly, it is an object of the present invention to provide a new and improved magnetometer.

Another object of the present invention is to provide a wide dynamic range, linear magnetometer for measurement of magnetic field components.

A further object of the instant invention is to provide a magnetometer wherein the output signal, corresponding linearly to the intensity of the measured magnetic field, is in accurate digital form.

The foregoing and other objects are attained in the instant invention by providing a solenoidal coil in surrounding relationship to a sinusoidally driven fluxgate sensor of a type well known in the prior art. A triangular wave generator is utilized to apply a low frequency triangular current wave of known period to this winding for producing a magnetic field parallel to the principal axis of the fluxgate sensor's saturable core, the field being continuously cycled in a precise linear manner. The instantaneous magnitude of this magnetic field is dependent upon the instantaneous amplitude of the triangular wave; the maximum value of the induced field being maintained in excess of the largest field to be measured. Since all the "zero shift errors" occur in the unlimited or analog portion of the output, the percentage error introduced in the final digital output signal by the "zero shift errors" are to a great extent minimized by the instant invention. The term "zero shift errors" includes many sources of error that occur when operating on a B-H curve that only approximates the ideal condition of a single trace curve passing through the zero point.

As in a conventional narrow-band saturable core fluxgate magnetometer the output from the fluxgate sensor is applied to a rejection filter that passes a signal at twice the frequency of the signal driving said fluxgate sensor. This signal is then amplified and applied to one input of a phase detector; the second input of the phase detector has a signal applied to it that originates at the oscillator and passes through a frequency doubler. In the conventional saturable core fluxgate magnetometer the output from the phase detector is an analog signal which is representative of the field being measured, as long as the magnetic field remains within the limited range of operation. Beyond either of the two signal extremes the output is clipped and remains at its respective constant amplitude. However, in the instant invention this analog signal becomes a gate signal for a time interval counter as hereinafter described. Due to the cycling of the triangular wave the output from the phase detector is approximately a square wave due to the clipping or limiting action of the narrow operating range of the saturable core. This signal is passed through a low pass filter, which removes unwanted signals not previously rejected, to a squaring circuit for placing the signal in a cleaner square wave form for the gating of a counter. The output from the squaring circuit is in turn connected to a time interval counter, which measures the time interval between two successive crossings of zero voltage by the gate signal as described below.

In an ambient or external magnetic field with a zero component parallel to the core, the fluxgate will switch rapidly back and forth from the clipped limit in one direction to the limit in the other direction each time the strong magnetic field created by the low frequency triangular wave passes rapidly through the narrow linear region near zero. The normal analog output signal is now an approximate square wave of equal positive and negative amplitudes, and most important with equal times spent at said positive and negative levels.

In the presence of an ambient field component along the core's axis, the reversal from limit to limit will still take place rapidly, but now it does so at the point in the cycle that the ambient and triangular wave fields are of equal magnitude and opposite in sign. The biasing effect of the ambient field modifies the square wave output so that the time spent at each of the two limited output levels differs and does so in a manner that is proportional to the magnitude of the ambient field's axial component.

By measuring the difference in time spent in either of the opposing limited states, relative to the known total period, a fraction is obtained. This fraction is related to the proportion of the triangular wave half amplitude that is required to achieve the condition of equal and opposite fields. This proportion gives the magnitude of the intensity of the magnetic field being measured. Accurate digital measurement of this fractional value, representing the magnitude of the magnetic field being measured, is obtained by measuring the period of time between successive gate signals, coming from the zero crossings of the phase detector analog output. Between successive gate signals the number of cycles of a high frequency signal from a standard oscillator are counted by conventional frequency scaling techniques. Upon the on gate signal the counter starts to count cycles of the standard oscillator signal and continues to do so until the off gate signal occurs. The total number of standard oscillator cycles counted is a direct measurement of the magnitude of the ambient magnetic field existing along the principal axis of the fluxgate sensor. Further, the digital count from the time interval counter is easily transmittable to points remote from the location of the magnetometer.

It can be readily seen that the foregoing basic technique can be adapted to wave forms other than triangular waves when the waveform is accurately describable with an appropriate equation.

Other objects and many of the attendant advantages of this invention will be readily appreciated as the same becomes better understood by reference to the following detailed description when considered in conjunction with the accompanying drawings wherein.

Figure 1:
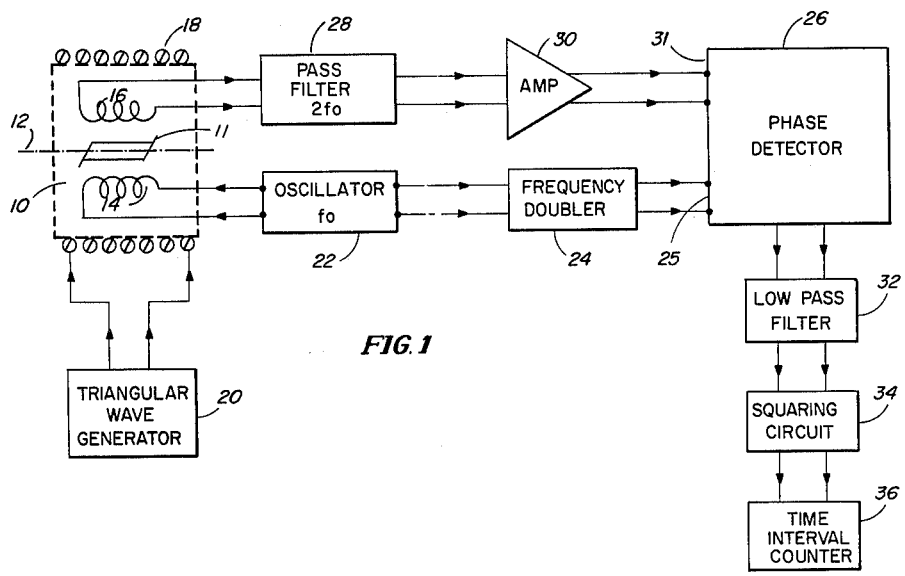
FIG. 1 is a partially schematic and partially block diagram of the improved magnetometer of the instant invention.
Figure 2A:
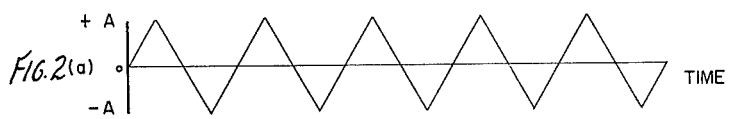
FIG. 2(a) is a wave diagram representing the magnetic field induced by the triangular wave generator.
Figure 2B:
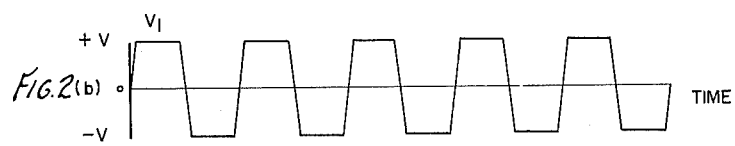
FIG. 2(b) is a wave diagram representing the clipped analog output from the phase detector for the zero field condition.
Figure 2C:
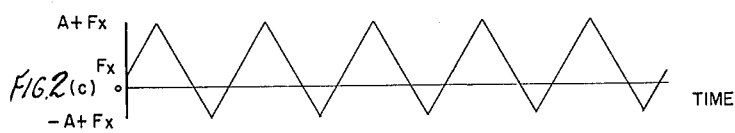
FIG. 2(c) is a wave diagram representing the composite magnetic field induced by the triangular wave generator and an ambient magnetic field.
Figure 2D:
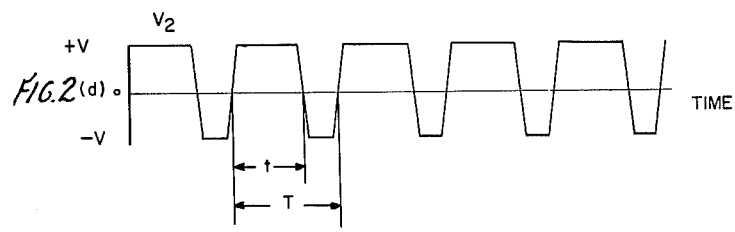
FIG. 2(d) is a wave diagram representing the clipped analog output from the phase detector when an external field exists along the core's principal axis.

Referring now to the drawings, the magnetometer fluxgate sensor 10 is shown in FIG. 1 as comprising a saturable core 11, having a principal axis 12. A signal winding 14 and a detecting winding 16 are wound around the saturable core 11. A principal feature of the instant invention relates in the particular use of an additional solenoidal winding 18 wound around the conventional windings 14 and 16 of the basic structure. This additional winding 18 is energized by a triangular wave generator 20. The windings 14 and 18 separately generate two different magnetic fields directed parallel to and along the principal axis 12.

Connected to the signal winding 14 is an oscillator 22 which provides a high-audio frequency wave, of fundamental frequency $f_0$, to the signal winding 14. The output from oscillator 22 is also connected through a frequency doubler 24 to one input 25 of a phase detector 26. Connected to the detecting winding 16 of the fluxgate sensor 10 is a filter 28 that passes second harmonics of the fundamental frequency $f_0$. The output from filter 28 is connected through an amplifier 30 to the second input 31 of the phase detector 26. The output from the phase detector 26, which is a limited analog signal, as described subsequently with respect to FIG. 2, is connected to a low pass filter 32. The output from the low pass filter 32 is connected through a squaring circuit 34 to a time interval counter 36. The time interval counter 36 contains a high frequency standard oscillator whose cycles are counted between successive gate signals.

The triangular wave generator 20, operating through the solenoidal winding 18, drives the fluxgate sensor 10 into the limited output region in one direction or the other depending upon the instantaneous sign, plus or minus, of the algebraic sum of the ambient field axial component and the triangular wave. When the wave is positive the induced magnetic field, orientated along the principal axis, is in one direction; when the triangular wave is negative the induced magnetic field, orientated along the principal axis, is in the opposite direction. By choosing a triangular wave of appropriate magnitude so as to give a maximum field through the saturable core 11 greater than the ambient field, the saturable core 11 of the fluxgate sensor 10, can be driven out of its narrow operation region for a large portion of one generated wave. When the fluxgate sensor 10 is placed in an ambient magnetic field to be measured, the length of time the core spends in either the positive or negative limited states will be dictated by the magnitude of said ambient field.

It is critical to the operation of the invention that the peak magnitude of the magnetic field induced by the triangular wave generator 20 be much greater than the magnitude of the magnetic field that will produce saturation of the saturable core 11. By the correct choice of triangular wave amplitude and core saturation value, saturable core 11 is unsaturated only when the algebraic sum of the ambient field and the field created by the triangular wave generator 20 is very close to zero. In the unsaturated state, in which the field summation is close to zero, an unlimited, or unclipped output signal will occur across the detector winding 16 and be in turn electrically transmitted to the phase detector 26. Comparison of the two signal inputs 25 and 31 in the phase detector 26 yields an analog output only when the input driving signal magnitude is between the two voltage levels corresponding to core saturations of opposite polarity, the remaining output is clipped or limited. The reversal of this approximate square wave occurs each time the sum of the magnitudes of the biasing field and the field generated by the triangular wave generator passes through zero.

The output signal from the phase detector 26, which is approximately a square wave, is then passed through the low pass filter 32 to a squaring circuit 34. The low pass filter 32 removes any components of the fundamental frequency or of high frequency noise that have passed through the phase detector 26. The squaring circuit 34 places the signal in better form for controlling the gating of a time interval counter 36. The output is then used to gate said time interval counter 36, which is turned on when one reversal occurs and counts until the next reversal occurs; the next reversal turning it off. This time period is related to the strength of the ambient magnetic field component parallel to the principal axis 12 of the fluxgate sensor 10 by means of equations set forth below. It is readily apparent that the fluxgate sensor 10 is used primarily as a switching device to provide a trigger signal from which time periods are easily, accurately measurable in digital form, and which does not contain the errors inherent in an analog signal of large range.

For further clarification of the instant invention reference is now made to FIG. 2. FIG. 2(a) is a diagrammatic representation of the magnetic field induced by the application of a triangular wave to the solenoidal winding 18, under the condition of zero external field. For this situation the time intervals the core spends in the limited condition between each reversal of field direction are equal. This results in the output from the phase detector shown in FIG. 2(b), i.e., a limited analog waveform having equal time in both the positive limited state $+V$ and the negative limited state $-V$. FIG. 2(c) is a diagrammatic representation of the composite magnetic field induced by the triangular wave generator and an ambient magnetic field component parallel to the principal axis of the fluxgate sensor. In the example shown the ambient field is in the positive direction biasing the triangular wave upward. It is evident from the drawing that the time spent in the positive direction and the time spent in the negative direction are unequal. This unequalness results in an asymmetrical output signal from the phase detector of the form shown in FIG. 2(d). The output signal now has a longer period of time spent in the positive limited state $+V$ and a shorter period of time spent in the negative limited state $-V$. The relationship between the time spent in the positive and negative limited states is a direct indication of the ambient magnetic field intensity existing parallel to the sensor's core.

In operation, a precise low frequency driving signal is generated by the triangular wave generator so that the total triangular wave period T is large. By measuring the difference of time spent in opposing limited states and comparing this difference to the total period, a fraction is obtained. This fraction is directly related to the fraction of the maximum magnetic field amplitude, induced by the triangular wave, necessary to achieve the condition of equal and opposite induced and ambient fields. The derivation of the applicable formula, illustrating this relation, is as follows, wherein $F_x$ equals the ambient field component; A equals the maximum value of the magnetic field induced by the triangular wave; T equals the total triangular wave period; $t$ equals the time spent in one limited state; and $T-t$ equals the time spent in the opposing limited state:

$$F_x = A\left[\frac{(t-(T-t))}{T}\right]$$

$$F_x = A\left[\frac{(2t-T)}{T}\right]$$

$$F_x = A\left(\frac{2t}{T}-1\right)$$

It is obvious from the foregoing equations that it is critical to the instant invention that the peak or maximum magnitude A, of the field generated by the triangular wave, be greater than the maximum magnitude of the external magnetic field to be measured. Further, the value of $t$ must lie within the range 0–T. If $t$ lies at the outer extremes a continuous D.C. signal occurs, rather than a square wave signal. Consequently, for accurate results, it is essential to have A somewhat in excess of the field to be measured. Furthermore, by choosing a value of A near the value of the field to be measured, but somewhat in excess thereof, an accurate measurement can be obtained. It is obvious that the accuracy of said measurement is a direct function of the value of A chosen. Therefore, a small value of A is chosen for measuring small fields and a large value for measuring large fields.

For illustrative examples, let the magnitude of the magnetic field induced by the triangular wave A equal 80,000 gammas with a T of 0.5 second (2 c.p.s. wave). The following results are obtained:

(a) $t=0$ seconds, limiting occurs in one direction only, for the full 0.5 second period, and $F_x < -80,000$. Since $F_x$ is always less than $-80,000$ gammas, zero crossings are not obtained and the measurement only yields the fact that $F_x < -80,000$.
(b) $t=0.125$ second, an asymmetrical square wave results, the limiting occurs in both directions, however, it is unequal and $F_x = -40,000$ gammas.
(c) $t=0.25$ second, a symmetrical square wave results, with equal time in the limited state at both levels, and $F_x = 0$.
(d) $t=\infty$ seconds, the limiting again occurs in one direction only for the full 0.5 second period; this is the opposite of Case a; therefore, $F_x > +80,000$ gammas.

As mentioned above, accurate digital conversion of the value of $t$ is obtained by using the period of $t$ as a gate to count a high frequency signal of the order of 100 to 1000 kilocycles per second on a binary scaling chain or period counter.

The circuits shown herein in block form utilize conventional elements and are well known in the prior art.

The basic technique, described herein, utilizing the precision of accurate frequency standards on outputs of analog instruments, can be adapted to the measurement of magnetic fields using other component sensors such as Hall generators and to the measurement of other physical parameters. All that is required is that the parameter to be measured have a separately generated linear wave variation, such as a triangular wave, superimposed on it. And further that a detector be available to indicate rapidly a reversal in either direction of the total quantity; i.e., an indication is received to trigger an accurate period counter, when the total quantity, the parameter being measured and the linear wave superimposed thereon, passes rapidly through the very narrow range, about zero, of a sensitive detector. For example, a D.C. current can be measured digitally by inserting a low impedance shunt in the circuit to be measured. A triangular waveform current is also presented to the shunt. An electronic null detector is then used to determine the instants of zero current in the shunt and these nulls are used to trigger a counter.

It will therefore be seen, upon consideration of the above disclosure, that a wide dynamic range, linear magnetometer having a digital output has been provided for measuring magnetic fields. The output being in digital form is easily transmittable to a recording point remote from the measuring point. By adjusting the amplitude of the triangular wave, very accurate magnetic field measurements can be made from a few gammas to several gauss.

The phase detector 31 is conventional in its design and operation. It generates an output signal whose magnitude and polarity is representative of the difference in phase of the comparison signals. One such phase detector is shown on page 245 of Fundamentals of Electrical Instruments, by C. T. Baldwin, published by Frederick Ungar Publishing Company, New York, 1962.

Obviously, numerous modifications and variations of the present invention are possible in the light of the above teachings. It is therefore to be understood that within the scope of the appended claims, the invention may be practiced otherwise than as described herein.

What is claimed as new and desired to be secured by Letters Patent of the United States is:

1. In a fluxgate sensor of the type having a saturable-core, a first winding disposed about said saturable-core for connection to a cyclic signal source, and a second winding disposed about said saturable-core for connection to a detector said second winding magnetically coupled to said core for detecting the second harmonic of the cyclic signal source frequency, the improvement comprising: a third winding disposed about said saturable-core and said first and second windings; a low frequency linear wave generating means for generating a linearly varying magnetic field through said saturable-core thereby altering the saturation characteristics of said saturable core; and electrical means for coupling said low frequency linear wave generating means to said third winding; said detector producing a varying output signal when said core is unsautrated and a clipped output signal when said core is saturated in both the positive and negative states; and indicating means electrically connected to said detector for measuring the amount of time the output signal of said detector is at the clipped levels corresponding to the positive and negative saturation states; said amount of time being directly related to the magnitude of the ambient magnetic field.

2. An improved fluxgate sensor as defined in claim 1, wherein the low frequency linear wave generating means is a triangular wave generator.

3. An improved fluxgate sensor as defined in claim 1, wherein said indicating means is a time interval counter employing an internally generated oscillator signal.

4. A fluxgate magnetometer for measuring over a wide range the ambient magnetic field intensity existing parallel to the principal axis of its fluxgate sensor comprising: fluxgate sensor means for detecting the existence of a magnetic field parallel to its principal axis; a solenoidal winding disposed about said sensor means; a triangular wave generator coupled to said winding for generating a varying magnetic field parallel to said axis having a maximum magnitude in excess of the largest field to be measured; said varying magnetic field altering the saturation characteristics of said sensor means so as to produce therefrom a linear waveform output; a phase detector electrically connected to said sensor means for detecting said linear waveform output; said detector generating a square wave output signal wherein the time spent in the positive and negative states is directly related to the magnitude of the ambient magnetic field intensity detected by the fluxgate sensor means; and indicating means electrically connected to said detector and including a counter for counting an internally generated oscillator signal; said counter being gated by the output square wave from said phase detector, said count being representative of the intensity of the ambient magnetic field measured.

5. A fluxgate magnetometer for measuring the ambient magnetic field existing along the principal axis of its fluxgate sensor comprising: saturable-core fluxgate sensor means for detecting the existence of a magnetic field existing parallel to its principal axis; said fluxgate sensor including first and second windings; signal driving means connected to said first winding for providing a cyclic signal to be detected; said second winding magnetically coupled to said sensor means for detecting the second harmonic of the signal driving means frequency; a solenoidal winding disposed about said fluxgate sensor means; low frequency triangular wave generating means coupled to said solenoidal winding for providing a linearly varying magnetic field parallel to the axis of said fluxgate sensor having a peak magnitude in excess of the largest field to be measured; said linearly varying magnetic field determining the time spent in the positive and negative saturation states by the core of said saturable-core fluxgate sensor means; whereby said second winding produces a varying output signal when said core is unsaturated and a constant output signal when said core is saturated in both the positive and negative states, and indicating means for indicating the amount of time the output signal is at the clipped levels corresponding to the positive and negative saturation states; said amount of time being directly related to the magnitude of the ambient magnetic field intensity.

6. A magnetometer as defined in claim 5 wherein said indicating means is a time interval counter employing an internally generated oscillator signal.

References Cited by the Examiner

UNITED STATES PATENTS

| | | | |
|---|---|---|---|
| 2,406,870 | 9/1946 | Vacquier | 324—43 |
| 3,159,785 | 12/1964 | Beynon | 324—43 |

RICHARD B. WILKINSON, *Primary Examiner.*